Oct. 1, 1946.  W. C. WEANER  2,408,497
POWER COUPLING MEANS
Filed May 9, 1945  7 Sheets-Sheet 2

Fig. 2.

INVENTOR,
WALTER C. WEANER,
By Herbert A. Minturn,
ATTORNEY.

Oct. 1, 1946. W. C. WEANER 2,408,497
POWER COUPLING MEANS
Filed May 9, 1945 7 Sheets-Sheet 4

INVENTOR,
WALTER C. WEANER,
By Herbert A. Minturn,
ATTORNEY.

Oct. 1, 1946.    W. C. WEANER    2,408,497
POWER COUPLING MEANS
Filed May 9, 1945    7 Sheets-Sheet 6

Inventor,
Walter C. Weaner,
By Herbert A. Minturn
Attorney.

Oct. 1, 1946. W. C. WEANER 2,408,497
POWER COUPLING MEANS
Filed May 9, 1945 7 Sheets-Sheet 7

INVENTOR,
WALTER C. WEANER,
By Herbert A. Minturn,
ATTORNEY.

Patented Oct. 1, 1946

2,408,497

UNITED STATES PATENT OFFICE 2,408,497

POWER COUPLING MEANS

Walter C. Weaner, Muncie, Ind.

Application May 9, 1945, Serial No. 592,904

10 Claims. (Cl. 192—3.2)

This invention relates to a hydraulic power transmission device in conjunction with a stabilizer having one particular application as a power transmitting coupling between an automobile engine and the drive wheels. The invention embodies a number of decided advantages including a positive mechanical interconnection for starting the vehicle into motion under such conditions where a simple hydraulic coupling would fail to do so, or where it is desirable to directly interconnect the engine with the drive wheels should it be desired to push the vehicle in order to start the power engine; the stabilizing of various parts to permit gear speed or direction changes and to reduce torsional vibration; and to maintain a coupling between the driving and driven members throughout an extremely wide range of speeds under variable power loads.

A further important advantage of the invention is found in the particular mechanical construction of the driving impeller and driven turbine wheel of the coupling providing not only for very effective coupling therebetween but also permitting easy construction and assembly of those parts.

These and many other objects and advantages of the invention will become apparent to those versed in the art in the following description of one particular form of the invention as illustrated in the accompanying drawings, in which.

Like characters of reference indicate like parts throughout the several views in the drawings.

Figure 1:
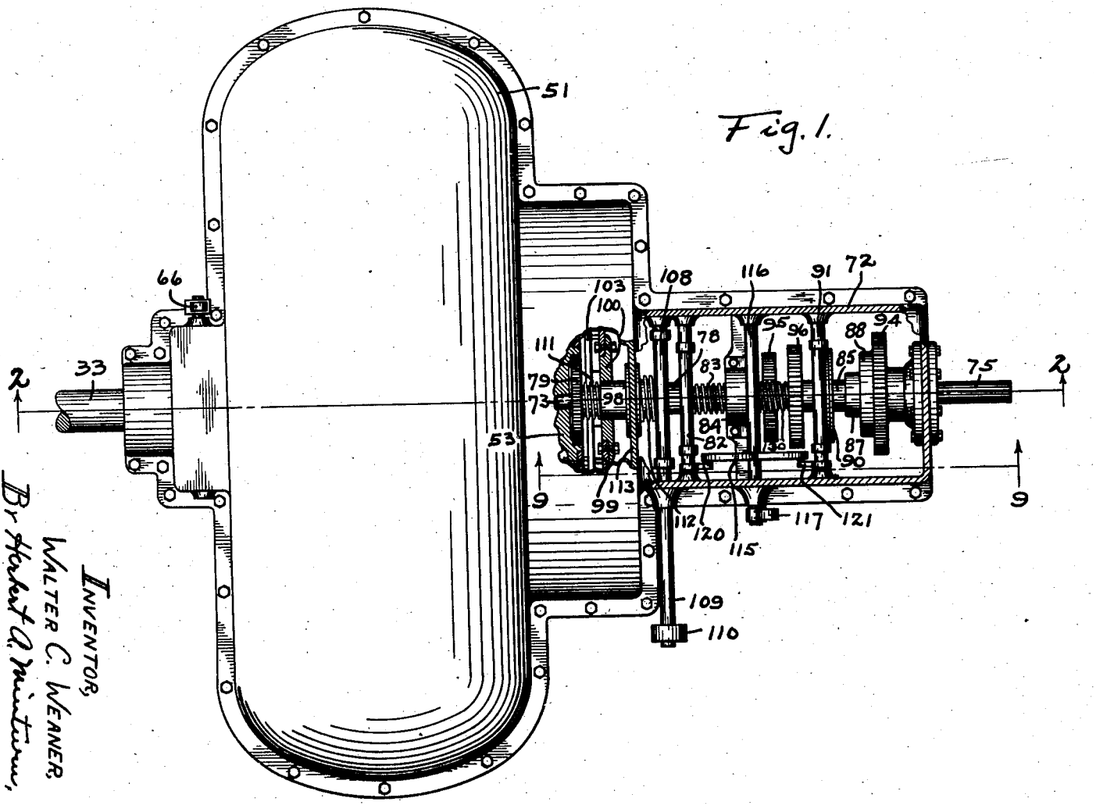
Fig. 1 is a view in top plan and partial transverse section.
Figure 2:
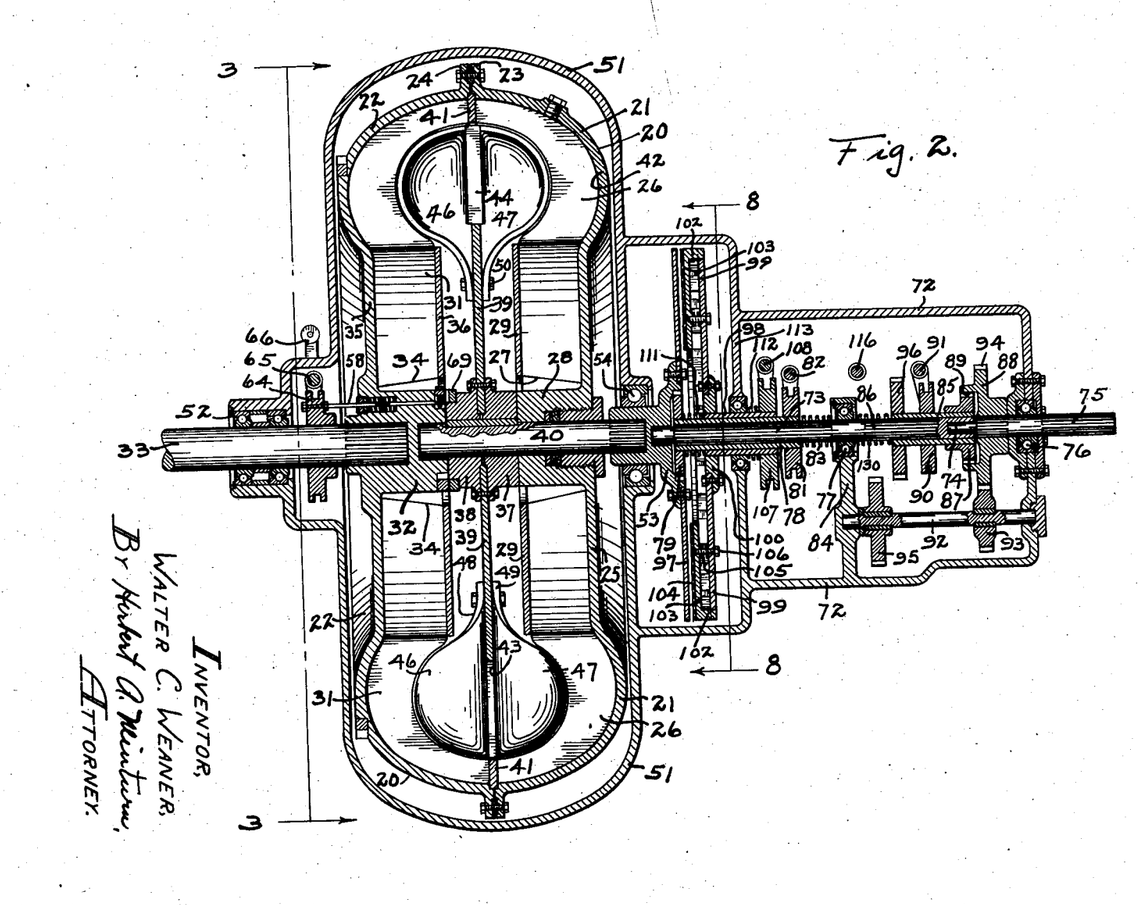
Fig. 2, a view in vertical longitudinal section on the line 2—2 in Fig. 1.
Figure 3:
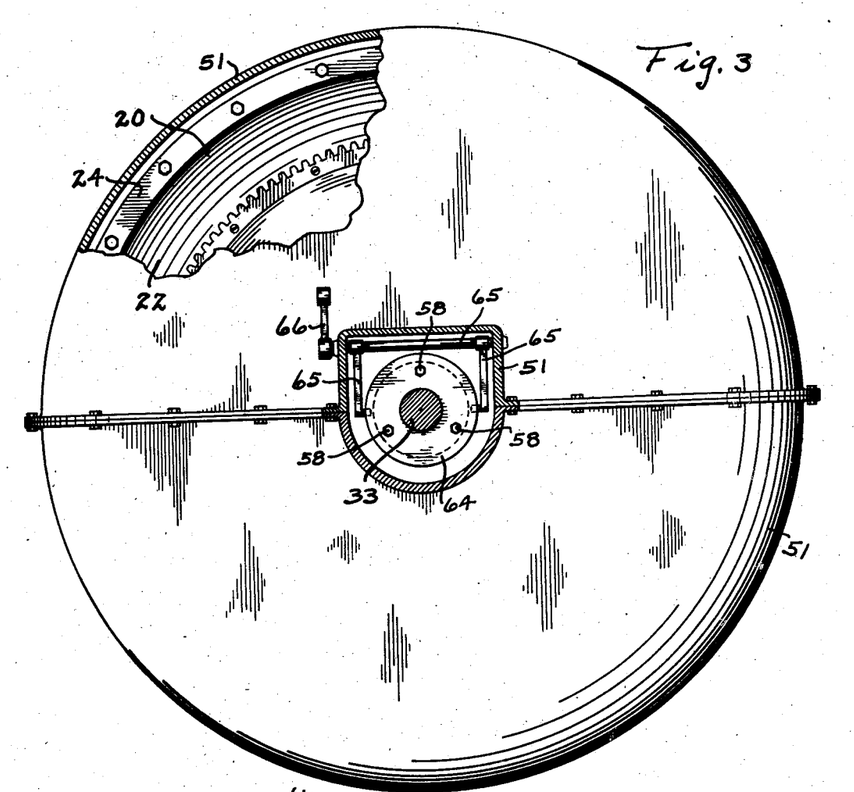
Fig. 3, a view in vertical transverse section on the line 3—3 in Fig. 2.
Figures 13, 14, 15:
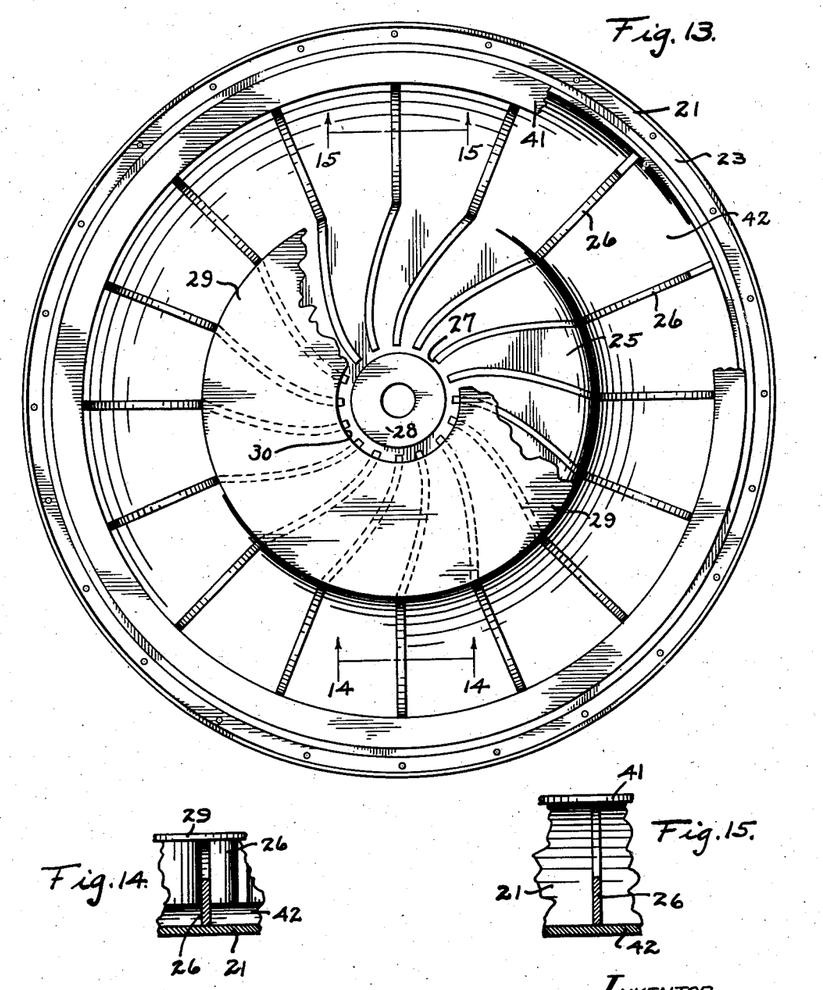
Fig. 13, a view in end side elevation of one side of the driving impeller with fragments broken away to disclose under details.
Fig. 14, a detail in section on the line 14—14 in Fig. 13.
Fig. 15, a detail in section on the line 15—15 in Fig. 13.

I form a driving impeller generally designated by the numeral 20 to consist of two members 21 and 22 bolted one to the other through annular flanges 23 and 24 about a mid-plane between the two members 21 and 22 normal to the axis of rotation. Referring to Figs. 2 and 13 primarily, the impeller member 21 has a central planar outer wall 25 also normal to the axis of rotation of the member 21. From the outer circumferential portion of this wall 25 the wall bulges outwardly by a portion 42 therefrom to curve around and back inwardly to terminate in the flange 23. Spaced apart circumferentially around the outer bulging peripheral portion of the member 21 are a plurality of radially positioned vanes 26 fixed to the member 21 to have a gradually increasing elevation in respect to the wall of the member 21 from under the flange 23 to the juncture of the bulge portion of the member 21 with the planar wall 25. In each instance, from this part of the vane 26, the vane continues in a fixed elevational dimension non-radially, to be arcuate to curve convexly forwardly in the direction of rotation from the plane of the straight portion of the vane, to terminate by an end 27 spaced from the central hub 28 which turns inwardly from the wall 25.

Then across the arcuate portions of the vanes 26 is a circular plate 29 terminating by its outer peripheral edge at the junctures of the radial and arcuate portions of the vanes 26. This plate 29 is provided with a central annular opening 30 to provide an entrance through that opening and around the hub 28 radially into the spaces between the inner terminal ends of the vanes 26. As indicated in Fig. 13, the adjacent vanes 26 terminate by inner closely spaced apart ends and diverge therefrom throughout the arcuate lengths and between the radially outwardly disposed parts. In the same manner the member 22 is formed to carry vanes 31 of the same dimensions and configurations as those of the vanes 26, the two sets of vanes 26 and 31 being one left hand in respect to a right hand of the other in reference to the arcuate inwardly extending portions of the respective vanes. In other words, the arcuate portions of the vanes 31 have their convex sides directed in the intended direction of rotation of the driving impeller as a whole.

The member 22 has a central hub 32 which is mounted on a driving shaft 33 to have a mechanical driving connection therebetween, herein shown as by means of a spline fit. The inner terminal ends 34 of the vanes 31 are spaced from the hub 32 and are inclined to slope upwardly and outwardly in respect to the inner end of the hub 32. In this respect the ends 27 of the vanes 26 slope likewise from the wall 25 in a diverging manner toward the plate 29 from the circumferential face of the hub 28. The arcuate portions of the vanes 31 are enclosed between the planar wall 35 of the member 22 and a circular plate 36 being a counter-part of the plate 29 employed in conjunction with the vanes 26. The plates 29 and 36 are spaced apart, one parallel with the other.

Between the hubs 28 and 32 are mounted hub members 37 and 38 between which is clamped a turbine wheel plate 39 to be centrally positioned thereby between the vane plates 29 and 36. The hub members 37 and 38 are fixed on a shaft 40 which axially and rotatably extends through the hub 28. The turbine wheel plate 39 is positioned to revolve in the space between the vane plates 29 and 36 in alignment with an annular plate 41 that is clamped across the outer opposing ends of the vanes 26 and 31, the plate 41 being gripped between the members 21 and 22. The peripheral edge of the turbine wheel plate 39 is in approximate running fit with the inner edge portion of the annular plate 41.

Figure 16:
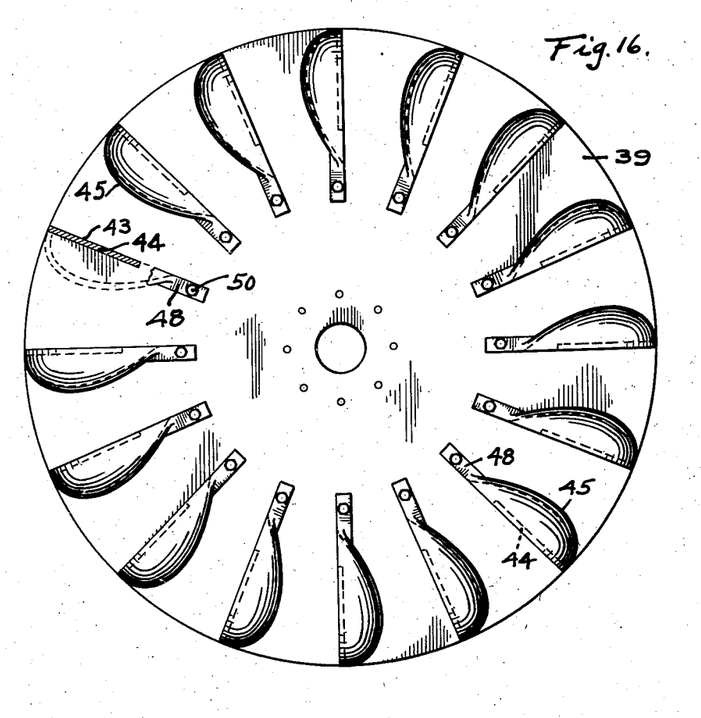
Fig. 16, a view in front elevation of the driven turbine wheel.
Figure 17:
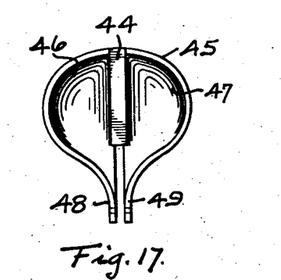
Fig. 17, a view in elevation from the concave side of a bucket or blade of the turbine wheel.
Figure 18:
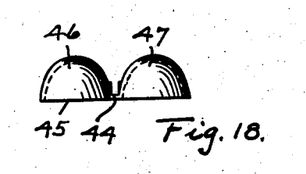
Fig. 18, a view in outer end elevation of the vane.

The turbine wheel plate 39 is provided with a plurality of radial slots 43 around its peripheral margin. Into each of these slots 43 is slipped the web 44 of a bucket 45, Fig. 16. Each bucket 45, Figs. 16–18, is in effect a pair of cups 46 and 47, one on each side of the web 44 and extending around therefrom in a leading direction of rotation of the plate 39. Each cup portion 46 and 47 has an attaching leg 48 and 49 respectively extending along the respective faces of the plate 39 and the bucket as a whole is secured to the plate by passing a bolt 50 through both of those legs and the intervening plate 39. Preferably, these cups 46 and 47 have a maximum depth adjacent their outer peripheral ends in respect to the periphery of the plate 39, and from that maximum depth the cups slope with a gradually decreasing depth to fade out on the radial line of the trailing side of the web 44 and the legs 48 and 49. In the present form of the invention, there are an equal number of buckets 45 in comparison to the number of sets of vanes 26 and 31, that is, with 16 buckets on the plate 39, there are 16 vanes 26 and 16 vanes 31. This number is given simply as an example without any limitation of the invention being thereby imposed. The peripheral margins of the cups 46 and 47 have a configuration to conform closely to the arcuate inner edges of the opposing plates 26 and 31 which are radially exposed beyond the plates 29 and 36 so that there may be but very little slippage of fluid around those cup margins and the opposing edges of the vanes. As indicated in Fig. 2, the plates 29 and 36 terminate in close proximity to the margins of the two cups 46 and 47 in each instance and then the attaching legs 48 and 49 curve inwardly rapidly to the plate 39.

Preferably an overall housing 51 encloses the driving impeller and the driven turbine wheel assembled as so far described. This housing 51 rotatably carries the driving shaft 33 through any suitable bearing means 52. On the rear side of the housing 51 is rotatably mounted a hub 53 rotatably carried by a suitable bearing 54 mounted in the housing 51. The shaft 40 which is driven by the turbine wheel plate 39 is drivingly interconnected and supported by the hub 53 by any suitable means, herein shown as by means of a splined fit.

The driving impeller thus driven by the shaft 33 is free to revolve around the centrally enclosed driven turbine wheel. Means are provided for positive mechanical interlocking the impeller and the turbine wheel one with the other whereby there is a direct mechanical drive from the shaft 33 through various interconnecting members to the driven shaft 40. This means is primarily shown in Figs. 3–7. Around the inner face of the hub 32 is mounted a ring 55 to be fixed thereto in any suitable manner. This ring 55 is notched out to receive a plurality of dogs 56, herein shown as three in number. Each dog is normally free to revolve about a central, radial axis of a suitable pin, herein shown as constituting a cap screw 57. The dog 56 is mounted in each instance to have either end thereof rocked beyond the outer plane of the ring 55 which is normal to the axis of the hub 32.

Figure 4:
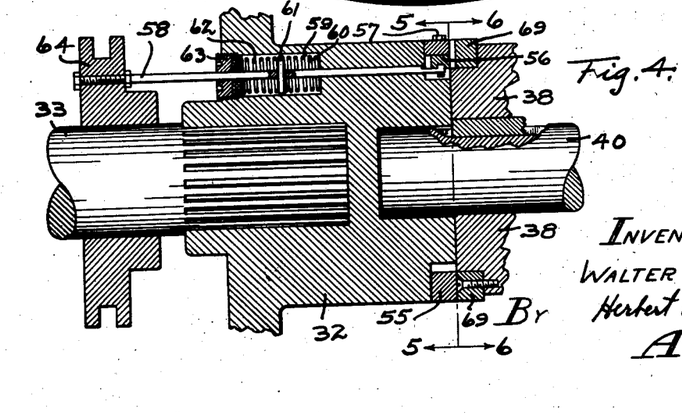
Fig. 4, a view on an enlarged scale in detail and in vertical longitudinal section of the positive interlocking mechanism between the driving impeller and the driven turbine wheel.

To control the rocking of these dogs 56, each one is engaged by a rod 58 which is slidingly mounted in the hub 32 to permit longitudinal shifting thereof. Each shaft 58 passes through a well 59, Fig. 4, provided in the hub 32 to have a compression spring 60 on one side of a transverse abutment 61 fixed to the rod 58 substantially central of the well 60 and a like compression spring 62 on the other side of the abutment 61. A nut 63 screw-threadedly enters the hub 32 co-axially of the rod 58 and the well 60 not only to seal that well but also to provide means for adjusting the compression of the two springs 60 and 62. The position of the abutment 61 along the rod 58 is made to be such that the rod normally holds the dog 56 in each instance to have both of its engaging ends within the ring 55, at least so that there is no projecting end beyond the face of that ring 55. Each of the rods 58 is carried on forwardly of the hub 32 to be interengaged by a shifting ring 64.

Figures 5, 6, 7:
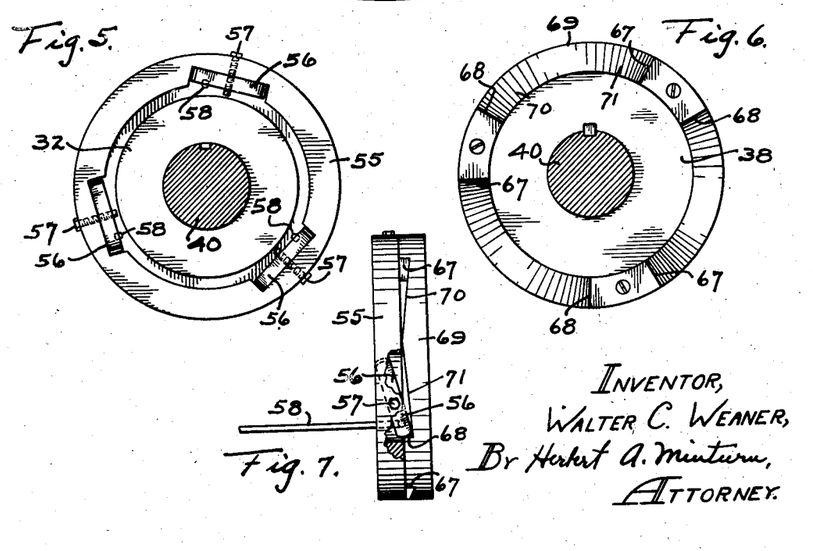
Fig. 5, a transverse section on the line 5—5 in Fig. 4.
Fig. 6, a vertical transverse section on the line 6—6 in Fig. 4.
Fig. 7, a detail in side elevation of the dog and dog receiving rings.
Figure 8:
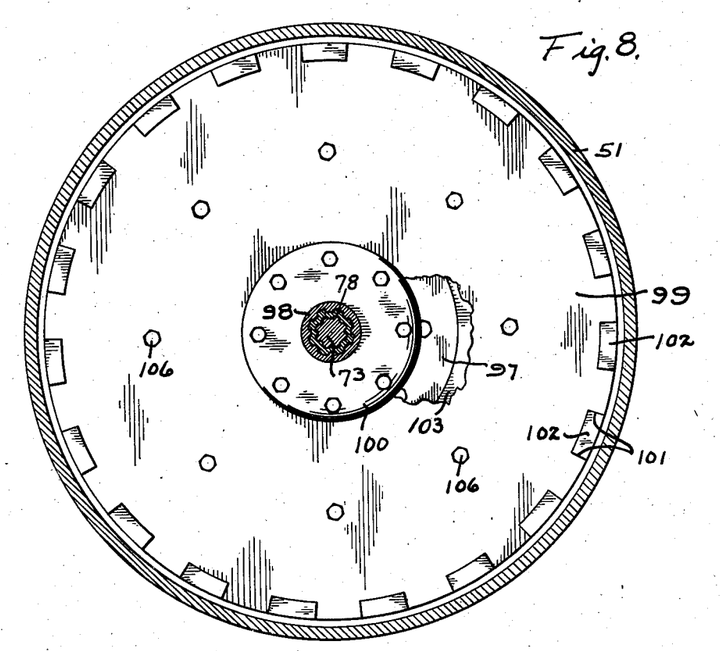
Fig. 8, a vertical transverse section on the line 8—8 in Fig. 2.

The ring 64 is carried within an extension of the housing 51 and is engaged by a shifting fork 65 rockably carried by the housing and formed to have an operating lever 66 externally of the housing. By rocking the lever 66 forwardly, the rods 58 are pushed rearwardly to shift the dogs to positions as indicated in Fig. 7. Shifting the lever 66 rearwardly will cause the opposite end of the dog 56 in each instance to be exposed outside of the ring 55 to the rear thereof.

On the hub 38 is provided a plurality of opposing abutments 67 and 68 against which the opposite ends of the dog 56 may be selectively engaged as determined by the direction of rocking of the lever 66. These abutments 67 and 68 in the present form of the invention are herein shown as being provided on a ring 69 secured to the hub 38. Thus it is to be seen that the driving impeller and the driven turbine wheel may be interlocked in either direction of rotation in respect to the axis of the shaft 33. The provision for the interlocking in both directions of rotation is made to provide not only for interlocking the two members together when both are driven in unison from the shaft 33, but also to interlock those two members together when the shaft 33 is driven from the shaft 40 as the case would be when the vehicle is being pushed to turn over the engine that is interconnected to the shaft 33, for engine starting purposes in case the usual storage battery would be unable to supply the necessary current as frequently happens in cold weather or when the battery is in such a state of discharge as to be inoperable. The ring 69 preferably has the inclined surfaces 70 and 71 respectively sloping inwardly of the ring 69 toward the respective abutments 67 and 68 to facilitate the sliding entrances thereagainst of the ends of the dog 56 to permit them to come into engagement with the abutments as the case may be.

From the rear of the housing 51 extends a transmission housing 72 wherein suitable change-speed gearing may be carried. A shaft 73 has its front end journaled axially in the hub 53 to be rotatable in respect to that hub. This shaft 73 by its rear end in turn carries the pilot 74 of the final drive shaft 75, a length of which extends rearwardly outside of the housing 72 and is rotatably supported by any suitable bearing, such as the ball bearing 76 carried by the rear housing end. Preferably, the shaft 73 is rotatably supported by a bearing 77 carried inside of the housing 72 spaced substantially intermediate of the ends of the shaft 73.

A sleeve 78 is mounted on the forward end of the shaft 73 to be shiftable therealong but to be revolved therewith, the sleeve 78 being herein shown as interconnected with the shaft 73 by means of longitudinally aligned splines. Fixed to the front end of the sleeve 78 is a toothed wheel 79 so formed that its teeth will intermesh with the internal teeth 80 formed within the hub 53 to afford a driving connection therewith, the wheel 79 being shown engaged with the hub teeth 80 in Figs. 1, 2, 9, and 11, and disengaged therefrom in Fig. 10.

On the rear end of the sleeve 78 is fixed a grooved shifting wheel 81 which is engaged by a shifting fork 82 rockably carried transversely of the transmission housing 72. By rocking the fork 82, the sleeve 78 may be shifted longitudinally along the shaft 73 to mesh the wheel 79 with the teeth 80 in the hub 53 or to shift the sleeve 78 in reverse direction to disengage the wheel 79 from the teeth 80. Normally, the sleeve 78 is urged to its forward position by means of a compression spring 83 helically surrounding the shaft 73 to have its ends bearing between the web 84 in the housing 72 and the rear end of the sleeve 78. This spring 83 therefore tends to maintain the wheel 79 in driving engagement with the hub 53, and only by the rocking of the fork 82 to cause the sleeve 78 to travel rearwardly to compress that spring 83 may the drive between the wheel 79 and the hub 53 be interrupted.

A disengaging drive connection is provided between the rear end of the shaft 73 and the final drive shaft 75. In the form herein shown this connection consists of a sleeve 85 longitudinally shiftable along the shaft 73 and drivingly connected therewith by any suitable means, such as by the splines 86; a gear wheel 87 fixed on the rear end of the sleeve 85; a gear wheel 88 having an internal gear 89 into which may be meshed the teeth of the gear wheel 87; and means for shifting the sleeve 85 to carry the wheel 87 into and out of mesh with those teeth 89. A spring 130 normally maintains the meshed position.

This means for shifting the sleeve 85 in the present showing consists of a grooved wheel 90 fixed to the sleeve 85 and interengaged by the shifter fork 91 which is rockably carried transversely of the transmission housing 72. The primary purpose for providing this disengaging connecting means between the shaft 73 and the shaft 75 is to permit a reverse direction of drive between those two shafts. A standard form of achieving this reverse drive is shown herein where a jack shaft 92 is longitudinally mounted within the housing 72 to have a spur gear 93 in constant mesh with the external teeth 94 of the gear wheel 88. Toward the forward end of the shaft 92 is fixed a spur gear 95 to have its teeth in the path of the teeth of the spur gear 96 which is mounted on the forward end of the sleeve 85. By suitable rocking of the fork 91, the sleeve 85 may be shifted forwardly along the shaft 73 to disengage the teeth of the wheel 87 from the teeth 89, and to engage the teeth of the wheel 96 with the teeth of the wheel 95 so that the drive then would be between the shaft 73 through the two gears 96 and 95, the shaft 92 and the two gears 93 and 88 which is fixed to the shaft 75.

It is obvious that other change-speed gearing may be incorporated within the transmission housing 72 as may be desired, but such gearing does not specifically enter into my invention, and it is not necessary to its operation and therefore is not shown. However, I do provide what I term a stabilizer which is in the nature of a clutch although no direct drive is taken therethrough. The purpose of this stabilizer is not only to dampen out vibrations, but also to control the relative speeds between the shafts 75, 73, and 40 to permit shifting from a neutral or no-drive arrangement to a direct driving connection or to permit shifting of the various members to the reverse drive connection.

In the present showing, I mount a clutch plate 97 on the hub 53 to have a contact face in a plane normal to the axis of the shaft 73. Longitudinally sliding on the outside of the sleeve 78 is a second sleeve 98 which is drivingly connected thereto in respect to rotary movement by any suitable means, such as through splines. On the forward end of the sleeve 98 is mounted a disc 99, herein shown as on a hub 100 fixed to the sleeve 98. The peripheral margin of this disc 99 is provided with a plurality of spaced apart notches 101 across which engage slidingly dogs 102 that extend rearwardly from a floating plate 103. This floating plate consists essentially of an annular ring having a forward planar face to which is preferably attached a friction ring 104. The plate 103 is yieldingly extended forwardly from the disc 99 by means of compression springs 105 bearing between that plate and disc and surrounding cap screws 106 that slidingly extend from the rear side and through the disc 99 to screw-threadedly engage the forward plate 103.

Fixed to the rear end of the sleeve 98 is a sleeve shifting grooved wheel 107 with which engages the shifting fork 108 that is transversely mounted across the housing 72 and from which extends externally of the housing 72 by a shaft 109 carrying an operating lever 110. In order to maintain the stabilizer thus described in a released or inoperative position, a compression spring 111 surrounds the sleeve 98 to bear between the wheel 79 and the end of the sleeve 98 tending to urge the sleeve 98 rearwardly, and a second compression spring 112 surrounds the sleeve 98 to bear between a transverse web 113 of the housing 72 and the front side of the shifting wheel 107. These two springs 111 and 112 are so designed that they will normally hold the friction ring 104 spaced from the plate 97 as indicated in Fig. 2.

Assuming as one application of the invention to be employed as a coupling between the engine and the rear wheel drive shaft in an automobile, the engine (not shown) will be directly coupled to the shaft 33 so that at all times when the engine is operating, the driving impeller 20 will be turning, and in fact will serve in the nature of a fly wheel. A suitable liquid having the characteristics commonly found for such purposes is placed within the impeller 20 which is then sealed against leakage of the liquid therefrom. The impeller, of course, is only partially filled. By reason of the fluid being within the impeller 20, it will tend to be thrown to the outer bulged peripheral portion thereof along both sets of vanes 26 and 31, and by reason of the shape of those blades throughout their lengths and in the bulged portion of the impeller, the fluid will be tended to be forced into the concave portions of the buckets 46 and 47 to cause in effect an interlocking through the fluid between the driving impeller 20 and the driven turbine wheel which is composed of the turbine wheel plate 39 and the buckets 45 carried thereon. Under some conditions there will, of course, be some slippage between those two elements, that is, one may turn at a different speed from the other, depending upon the loads and driving operations. At extremely low speeds of the engine, of course, there may be no driving power developed as between those two elements.

Figures 9, 10, 11, 12:
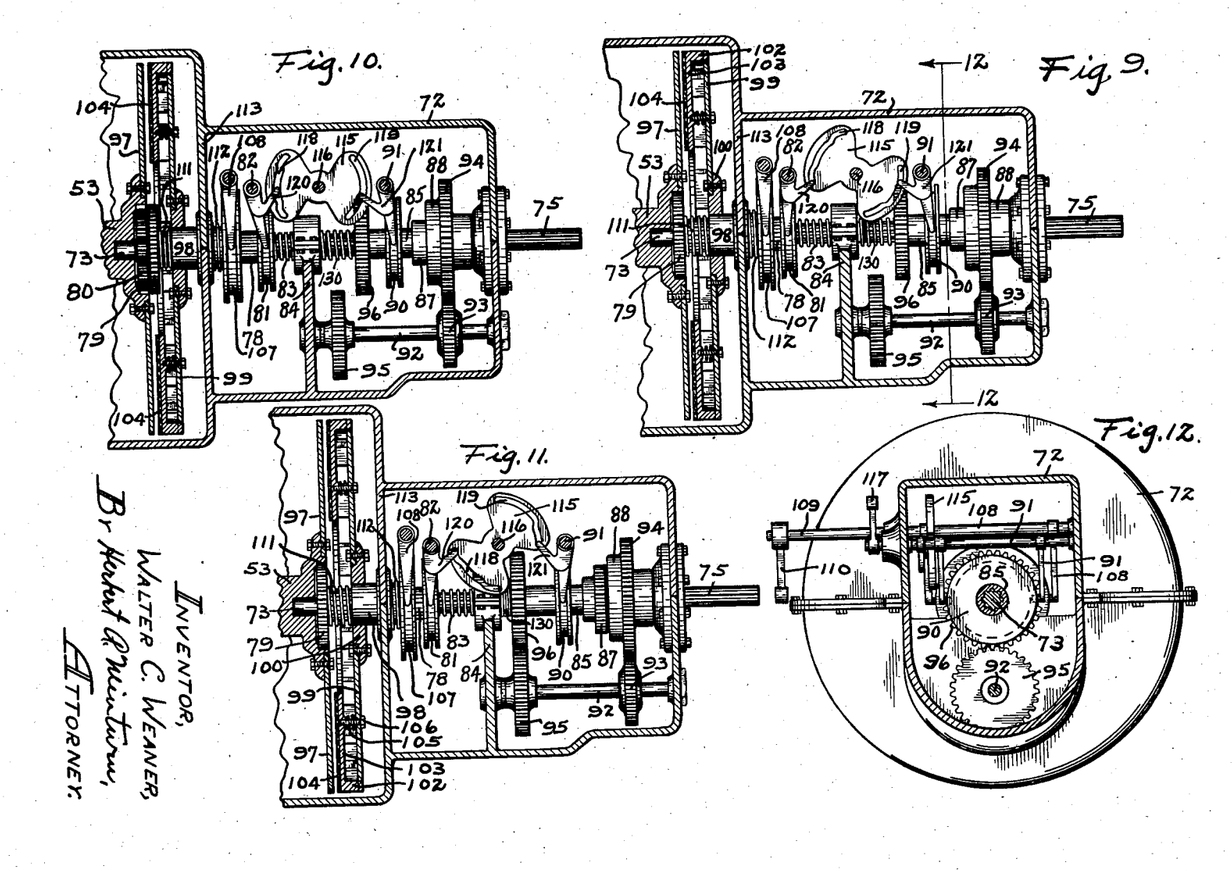
Fig. 9, a view in vertical longitudinal section on the line 9—9 in Fig. 1 showing a direct drive connection between the fluid drive through a mechanical transmission to a driven shaft.
Fig. 10, a sectional view on the same line but with the mechanical transmission drive disengaged from the fluid drive.
Fig. 11, a similar sectional view on the line 9—9 in Fig. 1 showing the mechanical transmission parts shifted to a reverse direction drive.
Fig. 12, a vertical transverse section on the line 12—12 in Fig. 9.

The hub 53 turns with the driven turbine wheel and with the parts in the positions indicated in Fig. 2, the shaft 75 will be likewise turned at substantially the same speed. This shaft 75 connects in the usual manner (not shown) with the drive shaft to the rear axle of the automobile. Normally, the drive thus formed is sufficient for most conditions of moving the automobile. To interrupt that drive to permit the car to come to a stop, the shifting fork 82 is rocked to pull the gear wheel 79 out of mesh with the teeth provided in the hub 53 as indicated in Fig. 10. In order to simplify the control of the shifting of this wheel 79 and also of the reverse gears, I provide a shifting cam 115 which is fixed on a shaft 116 transversely extending across and within the transmission housing 72 intermediate the shifting forks 82 and 91. One end of the shaft 116 extends laterally from the transmission housing 72 to carry an externally mounted operating lever 117.

The cam 115 carries cam slots 118 and 119 in the respective fore and aft end portions thereof. From the shifting fork 82 extends a lever 120 to have a finger entering into the slot 118. From the shifting fork 91 extends a lever 121 which has a finger entering the slot 119. These slots are formed to rock the two shifting forks 82 and 91 in the desired degree of travel upon rocking the lever 117. As indicated in Fig. 10, the cam 115 is rocked to a "neutral" position which is that position where the slot 118 has guided the finger of the lever 120 to swing the shifting fork 82 rearwardly to withdraw the gear wheel 79 from the hub 53 as above indicated. At the same time, the lever 121 has not been rocked, and therefore the sleeve 85 has been left in its normal rearwardly carried position as indicated in Figs. 1, 2 and 9 and 10. This is made possible by reason of the fact that the upper portion of the slot 119 is arcuate and has a radius of curvature centering on the axis of the shaft 116. The central portion of the slot 118 likewise has a curvature of a common radius centered on the same axis. The ends of the slot 118 however deviate outwardly at both ends to permit travel in those portions of the lever 120. The lower end of the slot 119 is carried inwardly in respect to the axis of the shaft 116 to swing the arm 121 accordingly.

Now, assuming that it is desired to interconnect the shaft 75 with the revolving hub 53, the shaft 116 may be rocked by means of the lever 117 in a clockwise direction, Fig. 9, to cause the shifting fork 82 to be rocked also in a clockwise direction to shift the sleeve 73 forwardly aided by the spring 83 to bring the wheel 79 into mesh and full seating condition within the hub 53. In order to prevent noise and secure ease of this operation, the shifting fork 108 may be initially rocked in a clockwise direction through the lever 110 to shift the plate 99 forwardly and gently press the ring 104 against the plate 97, to set up a sliding frictional engagement therebetween tending to bring the speed of the shaft 73 into synchronism with the speed of the hub 53.

With these operations completed, the shifting fork 82 is left in the position shown in Fig. 9. Now should it be desired to bring the drive back into the neutral position, the cam 115 would again be shifted back to the position shown in Fig. 10 aided if desired by operation of the stabilizer to permit easy withdrawal of the gear wheel 79 from the hub 53.

To bring the various members into the reverse direction drive, the cam 115 is rocked counterclockwise to the position shown in Fig. 11, in going to which position, the shifter fork 82 has been permitted to rock from the central portion of the cam slot 118 to swing sufficiently to permit the gear wheel 79 to return to its interengagement with the hub 53, and the sleeve 85 has been shifted forwardly along the shaft 73 to bring the gear 87 out of mesh with the gear wheel 88, and further to bring the gear 96 into mesh with the gear 95.

This takes care of normal driving operations. Sometimes it may happen that a positive mechanical drive is desirable as between the shaft 75 and the driven shaft 33 as above indicated, for example, when the car is to be pushed in order to start the engine. Then the shifter fork 65 is rocked as previously described to bring the dogs 66 into driving connection with the abutments 67 or 68 depending upon which way the car is being pushed, that is, from the front or the rear.

While I have herein shown in more or less diagrammatic manner one particular form of the invention, I have made no attempt to show a lubricating system for the various parts externally of the transmission housing 72 nor an exact mounting of bearings throughout the structure, since such features do not per se enter into the invention and may be changed under different applications. Mechanical changes in the construction may be employed without departing from the spirit of the invention, and I therefore do not desire to be limited to that precise form beyond the limitations as may be imposed by the following claims.

I claim:

1. A power coupling comprising a driving impeller; a driven turbine wheel; a driven shaft; mechanical means releasably interconnecting said wheel with said shaft; and stabilizer means yieldingly interconnecting said wheel and said shaft; said mechanical means comprising interlockable abutments carried by each of said wheel and shaft; and means shiftable longitudinally of said shaft to engage and disengage said abutments; said shiftable means being independent in operation from that of said stabilizer means.

2. A power coupling comprising a driving impeller; a driven turbine wheel; a driven shaft; mechanical means releasably interconnecting said wheel with said shaft; and stabilizer means yieldingly interconnecting said wheel and said shaft; and means mechanically interlocking said impeller and said wheel; said mechanical interlocking means comprising a shiftable dog on one of the elements comprising the impeller and wheel and a dog abutment on the other; means mounting said dog to permit it to be rocked selectively to oppose rotation of the abutment carrying element.

3. A power coupling comprising a driving impeller; a driven turbine wheel; a driven shaft; mechanical means releasably interconnecting said wheel with said shaft; and stabilizer means yieldingly interconnecting said wheel and said shaft; a reverse drive means normally disconnected from said shaft; and commonly actuated means for releasing said mechanical means and connecting said reverse drive means with said shaft.

4. A power coupling comprising a driving impeller; a driven turbine wheel; a driven shaft; mechanical means releasably interconnecting said wheel with said shaft; and stabilizer means yieldingly interconnecting said wheel and said shaft; and means mechanically interlocking said impeller and said wheel; said impeller and said wheel each having hubs rotatably on a common axis; and said mechanical interlocking means comprising a dog carried by one hub, an abutment carried by the other hub, means for rocking the dog into the path of said abutment, and means normally holding the dog out of said path.

5. A power coupling comprising a driving impeller having a pair of longitudinally opposing housing members joined together about a median plane therebetween, an annular flange extending radially inwardly from said junction, each of said members being bulged outwardly one from the other in outer portions thereof, vanes extending convexly in respect to direction of member rotation from inner central portions to said bulge and thence by radial directions across said bulging portions to said flange, said vanes of the two members being in sets, one vane directly opposed to another to leave a radial slot-like opening between the convex lengths and an approximate ovate opening between the radial lengths of the vanes; and a driven wheel comprising a disc in said slot opening rotatable normally independently of said impeller on an axis in common therewith, and a plurality of buckets mounted around the peripheral portion of said disc having a projected configuration matching approximately that of said ovate openings to permit relative travel therethrough, said buckets being concave on their trailing sides.

6. A power coupling comprising a driving impeller having a pair of longitudinally opposing housing members joined together about a median plane therebetween, an annular flange extending radially inwardly from said junction, each of said members being bulged outwardly one from the other in outer portions thereof, vanes extending convexly in respect to direction of member rotation from inner central portions to said bulge and thence by radial directions across said bulging portions to said flange, said vanes of the two members being in sets, one vane directly opposed to another to leave a radial slot-like opening between the convex lengths and an approximate ovate opening between the radial lengths of the vanes; and a driven wheel comprising a disc in said slot opening rotatable normally independently of said impeller on an axis in common therewith, and a plurality of buckets mounted around the peripheral portion of said disc having a projected configuration matching approximately that of said ovate openings to permit relative travel therethrough, said buckets being concave on their trailing sides; each of said buckets being divided into two cups, one on each side of said disc.

7. A power coupling comprising a driving impeller having a pair of longitudinally opposing housing members joined together about a median plane therebetween, an annular flange extending radially inwardly from said junction, each of said members being bulged outwardly one from the other in outer portions thereof, vanes extending convexly in respect to direction of member rotation from inner central portions to said bulge and thence by radial directions across said bulging portions to said flange, said vanes of the two members being in sets, one vane directly opposed to another to leave a radial slot-like opening between the convex lengths and an approximate ovate opening between the radial lengths of the vanes; and a driven wheel comprising a disc in said slot opening rotatable normally independently of said impeller on an axis in common therewith, and a plurality of buckets mounted around the peripheral portion of said disc having a projected configuration matching approximately that of said ovate openings to permit relative travel therethrough, said buckets being concave on their trailing sides; said disc having a slot entering from its peripheral edge, and each of said buckets having a web engaging across said slot, to have portions of the bucket extend symmetrically from each side of the disc.

8. A power coupling comprising a driving impeller having a pair of longitudinally opposing housing members joined together about a median plane therebetween, an annular flange extending radially inwardly from said junction, each of said members being bulged outwardly one from the other in outer portions thereof; vanes extending convexly in respect to direction of member rotation from inner central portions to said bulge and thence by radial directions across said bulging portions to said flange, said vanes of the two members being in sets, one vane directly opposed to another to leave a radial slot-like opening between the convex lengths and an approximate ovate opening between the radial lengths of the vanes; and a driven wheel comprising a disc in said slot opening rotatable normally independently of said impeller on an axis in common therewith, and a plurality of buckets mounted around the peripheral portion of said disc having a projected configuration matching approximately that of said ovate openings to permit relative travel therethrough, said buckets being concave on their trailing sides; said disc having a slot entering from its peripheral edge, and each of said buckets having a web engaging across said slot, to have portions of the bucket extend symmetrically from each side of the disc; said vanes terminating at their inner ends short of their axis of rotation to provide passageways circumferentially across and entering between those ends.

9. The combination with fluid drive means including a driving impeller and a driven turbine wheel; of abutments carried by the wheel; a driven shaft axially directed theretoward; a sleeve longitudinally shiftable of the shaft and drivingly connected therewith; a toothed member fixed to the sleeve to engage with said abutments; a second sleeve, slidably telescoping with said first sleeve and drivingly connected therewith; a clutch member driven by said wheel; a second clutch member fixed to said second sleeve in opposition to said first clutch member; and transmission means including a reverse drive connected to said driven shaft.

10. The combination with fluid drive means including a driving impeller and a driven turbine wheel; of abutments carried by the wheel; a driven shaft axially directed theretoward; a sleeve longitudinally shiftable of the shaft and drivingly connected therewith; a toothed member fixed to the sleeve to engage with said abutments; a second sleeve, slidably telescoping with said first sleeve and drivingly connected therewith; a clutch member driven by said wheel; a second clutch member fixed to said second sleeve in opposition to said first clutch member; and transmission means including a reverse drive connected to said driven shaft; and a yielding, floating member between said two clutch members normally separated from one of those members; and separate means operating each of said sleeves.

WALTER C. WEANER.